March 1, 1960     H. G. IRWIN     2,926,650
ARROW SHOOTER

Filed March 1, 1957     2 Sheets-Sheet 1

March 1, 1960 H. G. IRWIN 2,926,650
ARROW SHOOTER
Filed March 1, 1957 2 Sheets-Sheet 2

United States Patent Office 2,926,650
Patented Mar. 1, 1960

2,926,650
ARROW SHOOTER
Herbert G. Irwin, Noble, La.
Application March 1, 1957, Serial No. 643,289
2 Claims. (Cl. 124—24)

This invention relates to an arrow shooter, and contemplates a bow provided with a slide bar for supporting a bow string draw sleeve provided with an arrow chuck including a latch for latching the arrow chuck onto the bow string with an arrow notched on the bow string, a handle on the draw sleeve for drawing back the draw sleeve and chucked arrow and bow string to the position for shooting the arrow, a catch shoulder on the rearward portion of the slide bar and a sleeve latch on the draw sleeve for holding the draw sleeve in the drawn-back position on the slide bar while taking aim, and a trigger on the bow string latch of the arrow chuck for releasing the bow string to shoot the arrow, whereby steady shooting may be done in target work or hunting.

Other objects and advantages of this invention will appear throughout the following specification and claims.

In the drawing accompanying and forming a part of this specification.

Figure 1:
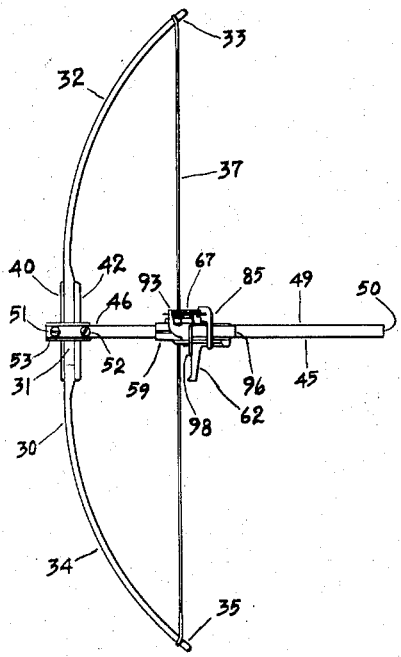
Figure 1 is a left side elevational view of a bow provided with a slide bar for supporting a right-hand bow string draw sleeve. The draw sleeve is shown in the forward position where the bow string latch of the arrow chuck is latched onto the bow string and where the nock end of an arrow can be put in the arrow chuck on the bow string.
Figure 4:
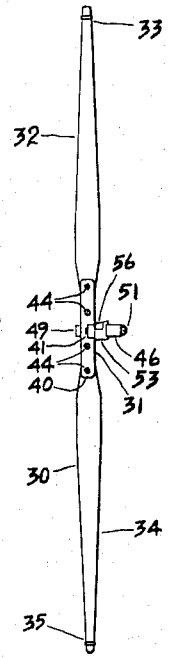
Figure 4 is a front side elevational view of the bow. The bow string draw sleeve is removed from the slide bar.
Figure 2:
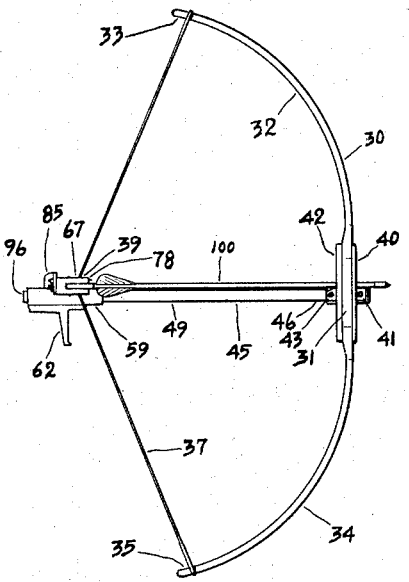
Figure 2 is a right side elevational view of the bow showing the draw sleeve and bow string located in the drawn-back position for shooting an arrow. An arrow is shown chucked in the arrow chuck.

Upon reference to Figures 1, 2, 3 and 4 of the drawing it will be noted that 30 indicates a bow including a bow stock or middle portion 31 between upper and lower limbs 32 and 34 and the bow limbs have ends 33 and 35 adapted to hold opposite ends of a taut bow string 37 for shooting an arrow over an arrow rest 56 on the middle portion of the bow. The middle portion of the bow is reinforced with front and rear lug-bars 40 and 42 attached with screws 44 and 44 which latter extend through perforations in the front lug-bar 40, through perforations in the middle portion of the bow and into threaded perforations in the rear lug-bar 42. The lug-bars have integral front and rear bar-lugs 41 and 43 provided with threaded perforations to receive the threaded ends of slide bar attachment screws 51 and 52. The bow is provided with a slide bar 45 for supporting a righthand bow string draw sleeve 59. The bow stock can be wrapped with suitable tape under the place for attaching the front end portion of the slide bar to afford a covered grip for holding the bow in the left hand. The bow shown is made of suitable wood, but a bow made of other suitable material can be employed. The lug-bars can be made from forgings or castings of suitable metal, or made of steel with the lugs welded or brazed on. Lug-bars made of suitable plastic can be employed on a small bow. Front and rear lugs for attaching the front end portion of the slide bar with bolts can be formed integral with a molded bow stock which can be made of suitable molding material. Integral lugs can be molded on a bow stock in forming a bow including suitable synthetic resin or suitable plastic.

Figure 5:
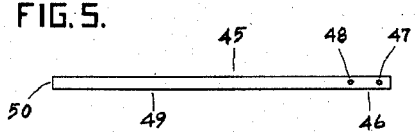
Figure 5 is a right side elevational view of the form of slide bar shown in Figures 1, 2, 3 and 4.
Figure 3:
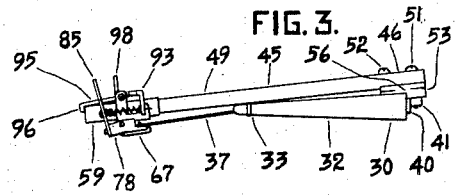
Figure 3 is an upper end plan view of the bow with the draw sleeve and the bow string located in the drawn-back position. The arrow is removed from the arrow chuck to better illustrate the drawn-back position of the bow string a little to the right.
Figure 6:
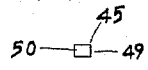
Figure 6 is a rear end elevational view of the slide bar shown in Figures 1, 2, 3, 4 and 5.

Slide bar 45, shown in more detail in Figures 5 and 6, is preferably rectangular in cross section and has a perforated front end portion 46 which can be attached rigidly with the middle portion of the bow. Perforations 47 and 48 receive the attachment screws 51 and 52, and the front end portion of the slide bar is attachable rigidly with the middle portion of the bow and offset by a spacer block 53 as shown in Figures 1, 2, 3 and 4. The slide bar can be made of suitable wood, or made of suitable plastic or light metal and has a rearward portion 49 which extends to the rear of the drawn-back position 39 of the bow string. The draw sleeve is supported on the rearward portion of the slide bar, and located on the bar at the drawn-back position of the draw sleeve is a catch shoulder 50 to catch on the draw sleeve latch catch shoulder to hold the draw sleeve in the drawn-back position on the slide bar.

Figure 7:
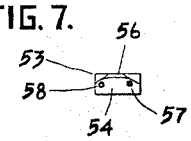
Figure 7 is a right side elevational view of the slide bar spacer block employed on the bow with the form of slide bar shown in Figures 1, 2, 3, 4, 5 and 6.
Figure 8:
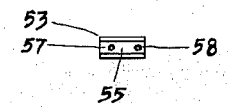
Figure 8 is a left side elevational view of the slide bar spacer block.
Figure 9:
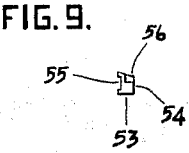
Figure 9 is a rear end elevational view of the slide bar spacer block.

Spacer block 53, shown in more detail in Figures 7, 8 and 9, has a right side 54 to abut against the bar-lugs 41 and 43 and face the middle portion of the bow, a left side channel 55 to seat the right side of the front end portion of the slide bar, perforations 57 and 58 to receive the attachment screws 51 and 52, and the spacer block is provided with an arrow rest upper side 56. The spacer block can be made of suitable plastic, suitable light metal or hard wood, and is attachable rigidly with the front end portion of the slide bar and the middle portion of the bow for offsetting the slide bar out of alignment with the rear of the middle portion of the bow as shown in Figures 1, 2, 3 and 4.

The bow string draw sleeve 59, shown in more detail in Figures 10 to 17 inclusive, has a passageway 60 for the slide bar and is shaped and sized inside to fit on the slide bar with only a little play to allow free slide movement endwise on the slide bar. The draw sleeve is provided with a handle 62 for moving the sleeve rearwardly and forwardly on the rearward portion of the slide bar, an arow chuck 67 for catching the bow string and holding an arrow notched on the bow string, a sleeve latch 96 for holding the sleeve in the drawn-back position on the slide bar while taking aim, a trigger 85 for releasing the bow string to shoot an arrow, and a sleeve latch trigger 98 for releasing the sleeve latch. Sleeve 59 can be made of suitable sheet metal with or without the longitudinal side split 61, or made from suitable seamless tubing.

The draw sleeve handle 62 has an integral plate portion 63 attached rigidly with the sleeve on the under side with rivets 65 and 66 which latter have flat heads countersunk on the inside of the sleeve. Handle plate portion 63 has a projection 64 extending beyond the left side of the sleeve, and the projection has a perforation to receive one end portion of the sleeve-latch pivot bolt 99. The handle and plate portion shown can be made from a casting of suitable light metal, or a suitable handle including a plate portion with perforated projection to support pivot bolt 99 can be made of metal parts riveted together or made of steel parts welded together. If preferred, a draw sleeve with a suitable integral handle may be made from a casting of suitable light metal.

Figure 16:
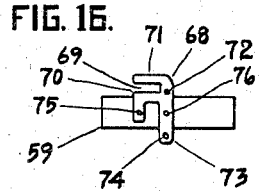
Figure 16 is an upper side plan view of the sleeve without the bow string latch of the arrow chuck and without the sleeve latch.
Figure 17:
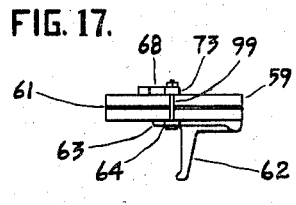
Figure 17 is a left side elevational view of the sleeve without the bow string latch of the arrow chuck and without the sleeve latch.
Figure 18:
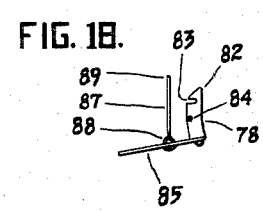
Figure 18 is an upper side plan view of the bow string latch of the arrow chuck.
Figure 19:
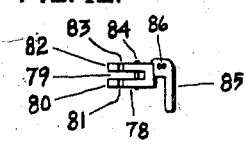
Figure 19 is a left side elevational view of the bow string latch of the arrow chuck. The latch spring guide pin is removed.

The arrow chuck 67 includes a plate portion 68 shown in more detail in Figure 16, and a double bow string latch portion 78 shown in more detail in Figures 18 and 19. Chuck plate 68 is attached rigidly with the bow string draw sleeve on the upper side with rivets 75 and 76 which latter have flat heads countersunk on the inside of the sleeve, and the chuck plate has a forwardly opened throat 69 between the rigid left chuck jaw 70 and the rigid right chuck jaw 71 which are offset over the right side of the draw sleeve, a perforation 72 adjacent to the rear end of the throat 69 and to the left of the longitudinal center of the throat to receive the cross pin or cross screw 84 by which latter the bow string latch portion of the arrow chuck is pivotally mounted on the chuck plate, a projection 73 extending over the left side of the draw sleeve and provided with a perforation 74 to receive one end portion of the sleeve-latch pivot bolt 99 which latter is shown in Figure 17. The over-projecting jaw portion of the chuck plate is only a little thicker than the nock end of an arrow, and the width of the chuck throat directly between the chuck jaws is only a little wider than the diameter of the nock end of an arrow. The chuck plate shown can be made from a casting of suitable metal, or made from a blank cut from a flat bar or plate of suitable metal. If preferred, a draw sleeve with a suitable integral over-projecting rigid chuck jaw portion including a suitable chuck throat 69 and perforation 72 may be made from a casting of suitable light metal.

Figure 10:
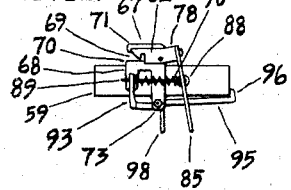
Figure 10 is an upper side plan view somewhat enlarged of the righthand bow string draw sleeve shown in Figures 1, 2 and 3.
Figure 11:
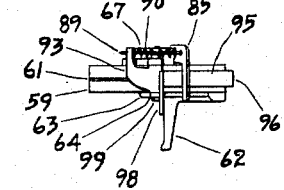
Figure 11 is a left side elevational view of the draw sleeve.
Figure 12:
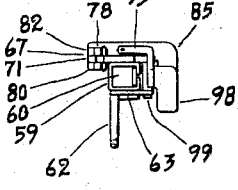
Figure 12 is a front end elevational view of the draw sleeve.
Figure 13:
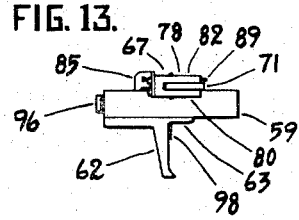
Figure 13 is a right side elevational view of the draw sleeve.
Figure 14:
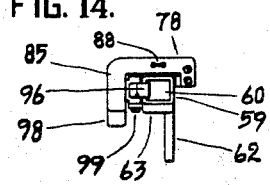
Figure 14 is a rear end elevational view of the draw sleeve.
Figure 15:
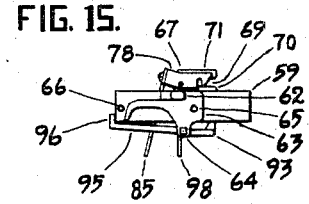
Figure 15 is an under side plan view of the draw sleeve.

The string latch portion 78 of the arrow chuck has a forwardly opened throat 79 between the lower latch jaw 80 and the upper latch jaw 82 to receive the chuck plate with only a little play, a cross pin or cross screw 84 to pivotally attach the string latch astraddle the chuck plate and throat 69 as shown in Figures 10, 12, 13 and 15, aligned notches 81 and 83 in the left side of the latch jaws to receive the bow string, a trigger 85 for moving the latch to release the bow string, and a guide pin 87 for a spring 90 for pressing the string latch onto the bow string. As shown in Figures 10, 11 and 14, trigger 85 extends from the rear end of the string latch across the upper side of the draw sleeve at the rear of the chuck plate and downwardly on the left side of the draw sleeve in reach of the thumb of the right hand embracing the draw-sleeve handle 62. Two closely spaced perforations 86 in the trigger receive the ringed end 88 of the latch spring guide pin. The bow string latch jaws integral at the rear end can be made from a casting of suitable metal, or made from a blank cut from a bar of suitable metal. The string latch trigger shown can be made from a blank cut from suitable sheet metal and fastened rigidly with the latch with screws. If preferred, a bow string latch with a suitable integral trigger may be made from a casting of suitable metal. All chuck plate corners and all string latch corners that come in contact with the bow string are well rounded to avoid cutting the bow string.

Figure 20:
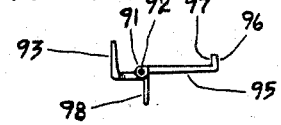
Figure 20 is an upper edge plan view of the draw sleeve latch.
Figure 21:
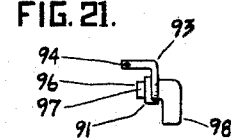
Figure 21 is a front end elevational view of the draw sleeve latch.

The draw sleeve latch, shown in more detail in Figures 20 and 21, has a hub 91 provided with a perforation 92 to receive the latch pivot bolt 99 and the hub is supported on the pivot bolt and between the left side projections 64 and 73, a forearm 93 extending forwardly from the hub and over the front edge of the chuck plate has a perforation 94 to receive the front end portion 89 of the spring guide pin 87, a rear arm 95 extending rearwardly from the hub has a catch end 96 including a catch shoulder 97 at the rear end of the draw sleeve to catch on the slide bar catch shoulder 50 and hold the draw sleeve in the drawn-back position on the slide bar, and a trigger 98 for moving the latch catch end 96 and catch shoulder 97 to release the draw sleeve for movement forward from the drawn-back position. Trigger 98 can be reached with the thumb of the right hand embracing the draw sleeve handle 62. Shown in Figures 10 and 11, the sleeve latch is pressed by the helix spiral compression spring 90 which latter is supported on the spring guide pin 87 between the sleeve latch forearm 93 and the bow string latch trigger 85. The sleeve latch shown can be made from a casting of suitable metal. A suitable sleeve latch can be made from steel parts welded together. If preferred, a draw sleeve with integral perforated projections for supporting the pivot bolt 99 or a pivot screw or a pivot pin through the sleeve latch hub, may be made from a casting of suitable light metal.

Bow 30 can be held in the left hand placed on the bow stock 31 under the front end portion of the slide bar rigidly attached as shown, and the bow string draw sleeve can be moved on the rearward portion of the slide bar with the right hand embracing the draw sleeve handle 62. When the draw sleeve is moved to the forward position shown in Figure 1 the taut bow string enters the chuck throat 69 and the bow string is caught in the string latch notches 81 and 83. While holding the bow upright with the left hand and taking an arrow in the right hand, the nock end of the arrow can be pushed backwardly into the chuck throat and notched on the latched bow string and the shaft of the arrow rested on the arrow rest in making ready for the draw. The draw can be made by pulling the draw sleeve backwardly to the position shown in Figure 2, whereupon the catch shoulder 97 of the spring pressed sleeve latch is caught on the slide bar catch shoulder 50 to hold the draw sleeve and the latched bow string and the chuck arrow 100 in the drawn-back position while taking aim. The bow string can be released to shoot the arrow by pressing the string latch trigger 85 forward with the thumb of the right hand embracing the draw sleeve handle. The forward movement of the string latch trigger moves the notched end portion of the string latch jaws to the right which strips the bow string out of the notches 81 and 83. The draw sleeve can be unlatched for movement forward on the slide bar by pressing the sleeve latch trigger 98 forward with the thumb of the right hand embracing the draw sleeve handle. The forward movement of the sleeve latch trigger moves the sleeve latch catch end 96 and shoulder 97 to the left and away from the slide bar catch shoulder 50.

Figure 22:
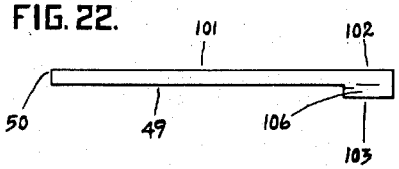
Figure 22 is an upper side plan view of a slide bar having a front end portion provided with a bow contact side projection and an arrow rest.
Figure 23:
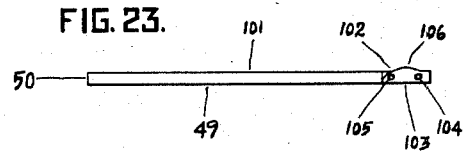
Figure 23 is a right side elevational view of the form of slide bar shown in Figure 22.
Figure 24:
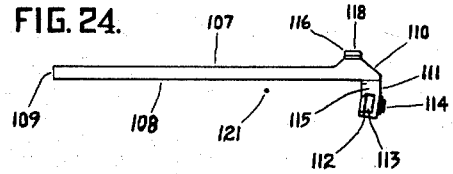
Figure 24 is an upper side plan view of a metal slide bar having a front end portion attachable rigidly with the middle portion of a metal bow.
Figure 25:
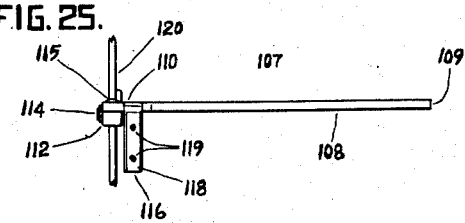
Figure 25 is a left side elevational view of the form of slide bar shown in Figure 24. The front end portion of the slide bar is shown as attached rigidly with the middle portion of a metal bow.
Figure 26:
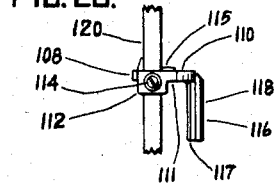
Figure 26 is a front end elevational view of the form of slide bar shown in Figures 24 and 25. The front end portion of the slide bar is shown as attached rigidly with the middle portion of a metal bow.
Figure 27:
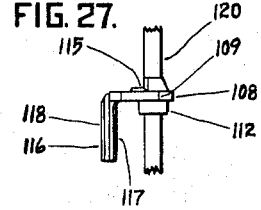
Figure 27 is a rear end elevational view of the form of slide bar shown in Figures 24 25 and 26.

Slide bar 101 shown in Figures 22 and 23, has a rearward portion 49 rectangular in cross section for supporting a righthand bow string draw sleeve such as draw sleeve 59, a catch shoulder 50 located at the drawn-back position for the draw sleeve and to catch the draw sleeve latch, a front end portion 102 provided with a bow contact side projection 103 and arrow rest 106, perforations 104 and 105 to receive the slide bar attachment screws 51 and 52, and the front end portion of the slide bar is attachable rigidly with the middle portion of bow 30 with the side projection 103 abutted against bar lugs 41 and 43 and offsetting the slide bar out of alignment with the rear of the middle portion of the bow. Slide bar 101 can be made of suitable wood or suitable plastic or suitable light metal and can be employed on bow 30 in the place of slide bar 45 and spacer block 53.

Slide bar 107 shown in Figures 24 to 27 inclusive, has a rearward portion 108 rectangular in cross section for supporting a righthand bow string draw sleeve such as draw sleeve 59 having an inside passageway shaped and sized to fit the rearward portion 108, a catch shoulder 109 located on the rearward portion 108 at the drawn-back position of the draw sleeve to catch the draw sleeve latch, a front end portion 110 provided with a bow contact side projection 111 and an arrow rest 115 and a bow clamp sleeve 112 and a handle 116. The bow clamp sleeve has a passageway 113 to receive the middle portion 120 of a metal bow, and a set screw 114 in the wall of the sleeve for clamping the middle portion of the bow rigidly in the clamp sleeve. The bow contact side projection 111 offsets the slide bar out of alignment with the rear of the bow middle portion 120 clamped in the sleeve 112. Handle projection 117 is integral with the front end portion of the slide bar and is provided with a body portion 118 attached with rivets or screws 119. Numeral 121 indicates the forward position of the bow string stretched taut between the ends of a metal bow having its middle portion clamped rigidly in the clamp sleeve 112. All of slide bar 107 except the set-screw 114 and handle body portion 118 and screws 119 can be made from a casting of suitable light metal. The slide bar can be made with a sleeve 112 and passageway 113 large enough to receive the middle portion of a bow made of suitable wood or other bow material, and the sleeve can be clamped on the middle portion of a wood bow with a metal plate between the point of the set-screw 114 and the middle portion of wood bow. If preferred, the slide bar may be made without the handle 116. In making the draw and in shooting an arrow with a bow provided wtih slide bar 107 and a righthand draw sleeve 59, the handle 116 is held in the left hand, and when the slide bar is not provided with a handle 116, the bow is held in the left hand gripped on the bow under the clamp sleeve 112.

Close range shooting can be done with a bow provided with any one of the slideb ars and the draw sleeve shown, but better aim can be taken and longer range shooting can be done with a suitable front sight on the bow and a rear sight on the bow string. Bow and bowstring sights shown in the drawing of application Serial Number 620,090, filed November 2, 1956, and now abandoned, can be employed on a bow provided with any one of the slide bars and the draw sleeve shown.

I claim:

1. In an arrow shooter including a bow having a middle portion between two limbs for holding a taut bow string, a bow string draw sleeve slide bar having a bow attachable front end portion, said slide bar having a rearward portion for supporting a bow string draw sleeve, a slide bar spacer block attached rigid with the middle portion of said bow, the front end portion of said slide bar attached with said spacer block rigid with the middle portion of said bow, said spacer block offsetting said slide bar out of alignment with the rear of the middle portion of said bow, a bow string draw sleeve slidable on the rearward portion of said slide bar, a latch on said sleeve, and a catch shoulder on the rearward portion of said slide bar to catch the latch on said sleeve to hold the sleeve in the drawn-back position.

2. In an arrow shooter including a bow having a middle portion between two limbs for holding a taut bow string, a bow string draw sleeve slide bar having a bow attachable front end portion, said slide bar having a rearward portion for supporting a bow string draw sleeve, a bow contact side projection on the front end portion of said bar, said projection attached rigid with the middle portion of said bow and offsetting said slide bar out of alignment with the rear of the middle portion of said bow, a bow string draw sleeve slidable on the rearward portion of said slide bar, a latch on said sleeve, and a catch shoulder on the rearward portion of said slide bar to catch the latch on said sleeve to hold the sleeve in the drawn-back position.

References Cited in the file of this patent

UNITED STATES PATENTS

| 369,153 | Alley | Aug. 30, 1887 |
| 1,328,967 | Reaben | Jan. 27, 1920 |
| 2,520,713 | Diehr | Aug. 29, 1950 |
| 2,638,885 | Keadle | May 19, 1953 |
| 2,714,884 | Ickes | Aug. 9, 1955 |